United States Patent [19]

Ishikawa et al.

[11] Patent Number: 5,052,122
[45] Date of Patent: Oct. 1, 1991

[54] PROCESS FOR CONTINUOUSLY DRYING PASTE MATERIAL FOR A HIGH-DENSITY DETERGENT

[75] Inventors: Takeshi Ishikawa; Hideyoshi Tanaka; Hisato Yasui, all of Wakayama, Japan

[73] Assignee: Kao Corporation, Tokyo, Japan

[21] Appl. No.: 482,616

[22] Filed: Feb. 21, 1990

[30] Foreign Application Priority Data

Feb. 23, 1989 [JP] Japan ................................. 1-44877

[51] Int. Cl.⁵ .............................................. F26B 5/06
[52] U.S. Cl. ............................................ 34/5; 34/15; 34/17; 34/69; 34/92
[58] Field of Search .................... 34/5, 17, 92, 10, 15, 34/69

[56] References Cited

U.S. PATENT DOCUMENTS 3,199,575 10/1962 Keller .
4,279,692 7/1979 Chino et al. .
4,608,764 9/1986 Levenberger ............................ 34/5

Primary Examiner—Henry A. Bennett
Attorney, Agent, or Firm—Sughrue, Mion, Zinn, Macpeak & Seas

[57] ABSTRACT

A process is described for continuously drying a paste material for a high-density detergent in a drying apparatus comprising a cylindrical casing and one or more sheet blades radially attached to a rotational shaft positioned at the center of the cylindrical casing such that the tip of each of the one or more sheet blades extends to the inner wall of the cylindrical casing, comprising the steps of feeding a paste material for a high-density detergent having a moisture content of from 20 to 35% by weight into the drying apparatus; forming a film of the paste material on the inner wall of the cylindrical casing by rotating the sheet blades; and scraping the film from the inner wall of the casing while continuously dehydrating and drying the film by heating under vacuum. The process of the invention conserves space and energy in drying the paste material for a high-density detergent. Furthermore, the process of the invention minimizes the deterioration of the paste material for a high-density detergent upon drying.

5 Claims, 1 Drawing Sheet

PROCESS FOR CONTINUOUSLY DRYING PASTE MATERIAL FOR A HIGH-DENSITY DETERGENT

FIELD OF THE INVENTION

The present invention relates to a process for continuously drying a paste material for a high-density detergent. More particularly, it relates to a process for continuously drying a paste material composition suitable for the production of a high-density granular detergent containing one or more surfactants including alkyl benzenesulfonates, alkyl sulfates, polyoxyethylene alkyl sulfates or α-sulfo fatty acid esters as main components.

BACKGROUND OF THE INVENTION

Recently, the demand for high-density granular detergents having an apparent specific gravity of at least 0.5 g/cm$^3$ is ever increasing, since high density detergents conserve resources. Furthermore these detergents are easy to carry, which makes them convenient for consumers.

Typical methods for the production of high-density granular detergents include those described in JP-A-61-64798, JP-A-61-66798, JP-A-61-69897, JP-A-61-69898, JP-A-61-69899, JP-A-61-69900, JP-A-61-76597 and JP-A-61-118500. (The term "JP-A" as used herein means a published unexamined Japanese patent application).

These methods enable the production of high-density granular detergents having excellent characteristics in some respects However, the methods described in JP-A-61-64798, JP-A-61-69897, JP-A-61-69898, JP-A-61-69899 and JP-A-61-69900 each include a spray drying step which is conventionally employed in the production of powdery detergents. Therefore, the above methods are disadvantageous in that a large apparatus and high energy consumption are required for the spray drying.

On the other hand, the methods described in JP-A-61-66798, JP-A-61-76597 and JP-A-61-118500 do not include a spray drying step, and are thus free from the above problem. However each of these methods include a grinding step where the material is ground to have a hardness exceeding a predetermined level. Thus, the moisture content of the starting materials is limited, such that the selection of starting materials for use in these methods is restricted.

SUMMARY OF THE INVENTION

In view of the above, the present inventors have sought to establish a process for the production of a high-density granular detergent, whereby the above-described problems are overcome. As a result, the present inventors have found that specific surfactants among those employed as main components of a high-density granular detergent, can be obtained in high concentration by a neutralization method different from that conventionally used in the art, which is disclosed, for example, in JP-A-1-41115 and JP-A-1-41116. Additionally, the present inventors have found that a mixture of such a surfactant thus obtained with other detergent components, which also have a high concentration, provides a detergent slurry of a low moisture content when mixed with other detergent components in the subsequent step such that the drying load is reduced. Furthermore, the present inventors have found that the thus obtained slurry is highly viscous and can therefore be dried by a drying method other than spray drying. These findings suggest that the above described neutralization method is suitable for the production of a high-density granular detergent.

These findings are described below in detail. Alkyl benzenesulfonates or alkyl sulfates, which are typical surfactants found in high-density granular detergents, have a high viscosity at a high concentration. Therefore the viscosity of the reaction media must be maintained at a low level in order to satisfactorily prepare these salts. Therefore, the neutralization reaction is generally conducted at a low concentration (approximately 55% by weight or less). The thus obtained neutralization product contains the surfactant at a low concentration, and a detergent composition prepared in the subsequent mixing step is in the form of a slurry containing 40 to 55% by weight of moisture. There is no choice, therefore, but to dry the slurry in a subsequent spray drying step which requires a large drying apparatus.

However, the present inventors have found that the neutralization reaction for the production of an alkyl benzenesulfonate or an alkyl sulfate unexpectedly proceeds in a satisfactory manner, even if the reaction mixture contains an elevated concentration of the surfactant, by conducting the neutralization reaction in a specific manner, to thereby obtain the alkyl benzenesulfonate or alkyl sulfate at a high concentration. The present inventors have further discovered that a high-density granular detergent can be produced through a drying method different from those conventionally employed in the art, by using the thus obtained salt at a high concentration.

Particularly, the present inventors have found that the salt obtained through the neutralization reaction according to the present invention has a low moisture content, and is therefore available for the production of a high-density granular detergent with the use of a drying method completely different from those conventionally employed in the art, and an apparatus therefor. Namely, the detergent paste material is dried in a small apparatus, with resulting energy savings.

The present invention, which is based on the above-described findings, provides a process for continuously drying a paste material for a high-density detergent in a drying apparatus comprising a cylindrical casing and one or more sheet blades radially attached to a rotational shaft positioned at the center of the cylindrical casing such that the tip of each of the one or more sheet blades extends to the inner wall of the cylindrical casing, comprising the steps of feeding a paste material for a high-density detergent having a moisture content of from 20 to 35% by weight into the drying apparatus; forming a film of the paste material on the inner wall of said cylindrical casing by rotating the sheet blades; and scraping the film from the inner wall of the casing while continuously dehydrating and drying the film by heating under vacuum.

BRIEF DESCRIPTION OF THE DRAWINGS

In FIGS. 1 and 2, there are shown cylindrical casing 1, jacket 1D; rotating blades 2, sheet blades 2B, vacuum means 3, heating means 4, paste material 5 for a high-density detergent, and the flaky dried material 5'.

DETAILED DESCRIPTION OF THE INVENTION

The process of the present invention may be conducted as follows. A paste material for a high-density detergent is fed into the inside of a cylindrical casing under vacuum. Then, the paste material for a high-density detergent is applied to the inner wall of the cylindrical casing with the tips of the rotating blades to thereby form a film preferably having 1.5 to 5.5 mm thereon. The film is rapidly dried by heating, and is scraped with the rotating blades to thereby obtain a flaky dried material.

Figure 1:
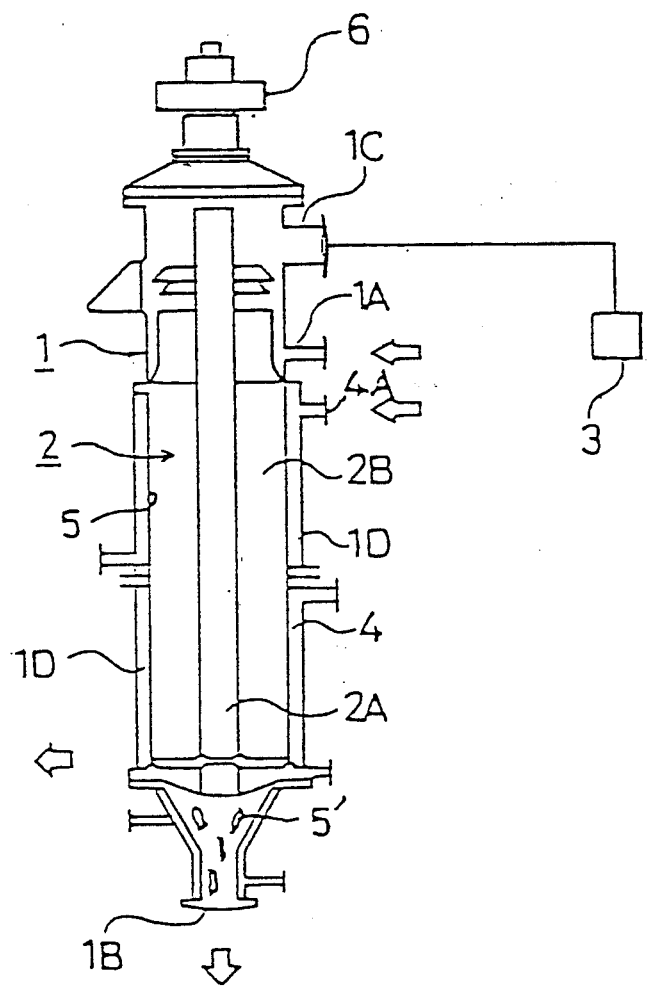
FIG. 1 is a vertical sectional view showing the inside of a drying apparatus for drying the paste material for a high-density detergent according to the process of the present invention.
Figure 2:
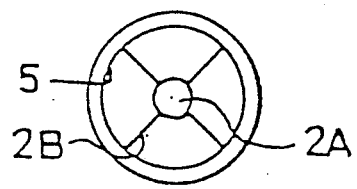
FIG. 2 is a horizontal sectional view of the drying apparatus.

Now, the present invention is illustrated based on the drying apparatus shown in FIGS. 1 and 2. FIG. 1 is a vertical sectional view showing the inside of a drying apparatus for drying the paste material for a high-density detergent according to the process of the present invention. FIG. 2 is a horizontal sectional view of the drying apparatus of FIG. 1.

As shown in FIG. 1, the drying apparatus includes a vertically located cylindrical casing 1 provided with inner rotating blades 2. The rotating blades comprise four sheet blades 2B which are radially attached to a rotational axis 2A positioned at the center of the cylindrical casing 1. The tip of each sheet blade extends to the inner wall of the cylindrical casing 1.

A feeding port 1A through which a paste material for a high-density detergent is introduced, is located at the top of the cylindrical casing 1, while a discharging port 1B is located at the bottom of the same for discharging a dried flaky material to a subsequent unit operation.

Further, an exhaust port 1C, to which a vacuum means 3 is connected, is located above the feeding port 1A. The interior of the cylindrical casing 1 is evacuated with the vacuum means 3 via the vacuum port 1C.

Furthermore, heating means 4 is arranged around the cylindrical casing 1 in order to heat the inner wall of the cylindrical casing 1. The heating means 4 comprises a circulation tube in which a heating medium, such as steam, is circulated. A heating medium source (not shown) is connected to the inlet 4A of the circulation tube. In FIG. 1, 6 is a motor for driving the rotating blades 2.

The apparatus of FIG. 1 may be operated in accordance with the invention as follows.

A paste material for a high-density detergent is fed through the feeding port 1A of the cylindrical casing 1. Then, the paste material 5 is applied onto the inner wall of the cylindrical casing 1 by the action of the tips of the sheet blades 2B of the rotating blades 2, to thereby form a film on the inner wall of the cylindrical casing. The frictional heat evolving between the rotating sheet blades 2B and the film of the paste material for a high-density detergent on the inner wall, together with the heat originating from the heating medium, accelerates the drying of the paste material for a high-density detergent 5 in the form of a film. The paste material for high-density detergent 5 is thus rapidly dried and converted into a flaky material which is readily peelable from the inner wall of the cylindrical casing 1. Subsequently the dried material 5' is scraped with the tips of the sheet blades 2B, which are continuously rotated. The flaky dried material thus scraped is then discharged through the discharging port 1B at the bottom of said cylindrical casing 1, and transported to a subsequent grinding step.

In addition, the heating can be effected at a low temperature since the paste material is dried under vacuum. Therefore, thermal degradation of the paste material for a high-density detergent 5 is minimized.

In order to convert the paste material for a high-density detergent 5 into the flaky dried material 5' by the above-described process, the following operating conditions are preferably employed.

(1) Degree of vacuum in cylindrical casing 1: from 100 to 500 torr.
(2) Inner wall temperature: from 100° to 200° C.
(3) Peripheral speed of rotating blades: from 5 to 12 m/sec.
(4) Moisture content of paste material for high-density detergent: from 20 to 35 % by weight.

Although the rotating blades 2 are preferably in the form of sheet blades 2B, the form and number of the blades are not restricted so long as the above-described effect is achieved thereby.

As described above, the paste material for a high-density detergent 5 suitable for use in the process of the present invention is a detergent composition having a moisture content of from 20 to 35% by weight, comprising an alkyl benzenesulfonate and/or an alkyl sulfate, (hereinafter, "surfactants"), together with additives commonly used in the art such as a builder. When the moisture content of the paste material for a high-density detergent is lower than 20% by weight, the neutralization reaction and the subsequent mixing with other detergent compositions cannot be satisfactorily conducted. When it exceeds 35% by weight, on the other hand, the drying is insufficient.

The detergent material containing said one or more surfactants is suitable, in particular, for the production of a paste material for a high-density detergent. The detergent material has a remarkably low moisture content, compared with those employed in conventional spray drying methods, and is in the form of a paste. Thus, it can be dried in the form of a film, as described above, by using a compact apparatus, which considerably saves space compared with conventional spray drying means. Furthermore, the detergent material containing the one or more surfactants for use in the present invention contains a small amount of moisture, as described above, and the drying temperature may be lowered by drying the material under vacuum. The above factors in addition to the evolution of frictional heat contribute to the efficient and considerable savings of energy required for the drying.

The method of the invention is suitably applied to a material containing a thermally unstable component, since the material is dried under vacuum at a relatively low temperature. In addition, the process of the present invention can be widely applied to various paste materials for high-density detergents other than those for high-density granular detergents.

The present invention is further illustrated in reference to the following non-limiting Examples.

EXAMPLES

In each of the following Examples 1 to 4, a paste material for a high-density detergent having the following composition was preliminarily prepared. The thus obtained paste material for a high-density detergent was then dried while varying the operating conditions as set forth in Table 1.

(1) Preparation of paste material for high-density detergent

The following components were kneaded in a kneader (1600-65CVJA-3, type 7; manufactured by Satake Kagaku Kikai Kogyo K.K.) to thereby provide a paste material for a high-density detergent.

| | |
|---|---|
| Sodium straight chain alkylbenzene-sulfonate ($C_{10}$–$C_{13}$, moisture content: 20 wt %) | 32 parts by weight |
| Sodium alkylsulfate ($C_{12}$–$C_{16}$, moisture content: 30 wt %) | 12 parts by weight |
| Polyoxyethylene alkyl ether ($C_{12}$–$C_{14}$) | 3 parts by weight |
| Soap (alkali salt of higher fatty acid of $C_{16}$–$C_{18}$) | 4 parts by weight |
| Zeolite (4A type, moisture content: 3 wt %) | 10 parts by weight |
| Sodium carbonate (powder, moisture content: 3 wt %) | 3 parts by weight |
| Sodium sulfate (powder) | 1 part by weight |
| Sodium silicate (moisture content: 60 wt %) | 36 parts by weight |
| Polyethylene glycol 6000 (powder) | 1 part by weight |

(2) Drying of paste material for high-density detergent

The above-described paste material for a high-density detergent was fed into a feeding port located at the top of a drying apparatus in accordance with the present invention (Vertical thin film evaporator having a rotating blade: mfd. by Hitachi, Ltd.), using a pump for a highly viscous paste (Snake Pump NE-15; mfd. by Hyoshin Sobi K.K.). (The drying apparatus manufactured by Hitachi, Ltd. has generally been employed for the evaporation or distillation of a high viscous slurry, the concentration of foods and medical supplies, and the deaeration or demonomer of polymer resin, etc., and has never been used for the drying of detergent itself. Further, the high-density detergent conventionally used is generally subjected to a high-density treatment via a spray drying step of high water-content slurry, and a method of directly drying low water-content slurry in a thin film has not ever been practiced.) Then the paste material was continuously dried while varying the drying conditions as specified in Table 1. The inner diameter of the trunk of the casing of the drying apparatus was 100 mm, the length of the heat transfer portion of the trunk was 300 mm, while the heat transfer area was 0.1 $m^2$.

As Table 1 shows, the dried material obtained in each of Examples 1 to 4 had a low moisture content of 2.5 to 5.6% by weight, which is comparable to results achieved by conventional spray drying methods. Furthermore, the drying apparatus of the invention is considerably smaller than a comparable spray drying apparatus.

TABLE 1

| | Example | | | |
|---|---|---|---|---|
| | 1 | 2 | 3 | 4 |
| Operation conditions: | | | | |
| Moisture content of paste material for high-density detergent (% by wt.) | 25.5 | 25.5 | 25.5 | 25.5 |
| Feeding rate (kg/hr) | 19.9 | 24.2 | 35.3 | 21.8 |
| Inner wall temp. of casing (°C.) | 150 | 150 | 150 | 164 |
| Degree of vacuum in casing (Torr) | 400 | 400 | 100 | 400 |
| Peripheral speed of blades (m/sec) | 8.5 | 6.3 | 6.3 | 6.3 |
| Heat transfer area ($m^2$) | 0.1 | 0.1 | 0.1 | 0.1 |
| Results: | | | | |
| Moisture content of dried material (% by wt.) | 4.9 | 5.6 | 5.3 | 2.5 |
| Temp. of dried material (°C.) | 105 | 110 | 105 | 125 |
| Retention time in casing (min) | 2.0 | 1.6 | 1.1 | 2.1 |
| Effective drying rate (kg $H_2O/m^2$ hr) | 43.2 | 51.0 | 54.4 | 60.2 |

According to the present invention, space and energy are conserved in the drying of a paste material for a high-density detergent, while the deterioration of the paste material for a high-density detergent is minimized. Thus the process of the present invention is suitable for the production, in particular, of a high-density granular detergent.

While the invention has been described in detail and with reference to specific embodiments thereof, it will be apparent to one skilled in the art that various changes are modifications can be made therein without departing from the spirit and scope thereof.

What is claimed is:

1. A process for continuously drying a paste material for a high density detergent in a drying apparatus comprising a cylindrical casing and one or more sheet blades radially attached to a rotation shaft positioned at the center of the cylindrical casing such that the tip of each of the one or more sheet blades extends to the inner wall of the cylindrical casing, comprising the steps of feeding a paste material for a high-density detergent having a moisture content of from 20 to 35% by weight into the drying apparatus; forming a film of the paste material on the inner wall of the cylindrical casing by rotating the sheet blades; and scraping the film from the inner wall of the casing while continuously dehydrating and drying the film by heating under vacuum.

2. A process as in claim 1, wherein said drying apparatus further comprises a feeding port located at the top of the cylindrical casing, a discharging port located at the bottom of the cylindrical casing, vacuum means for evacuating the interior of the cylindrical casing, and heating means for heating the inner wall of the cylindrical casing.

3. A process as in claim 1, wherein the pressure in the cylindrical casing is from 100 to 500 torr.

4. A process as in claim 1, wherein the inner wall temperature of the cylindrical casing is from 100° to 200° C.

5. A process as in claim 1, wherein the peripheral speed of the one or more rotating sheet blades is from 5 to 12 m/sec.

* * * * *